Jan. 27, 1942.     H. A. MANTZ     2,271,507
THERMOCOUPLE LEAD CONNECTOR
Original Filed Jan. 8, 1937

INVENTOR.
Harold A. Mantz
BY
ATTORNEYS.

Patented Jan. 27, 1942

2,271,507

UNITED STATES PATENT OFFICE 2,271,507

THERMOCOUPLE LEAD CONNECTER

Harold A. Mantz, Milwaukee, Wis., assignor to Milwaukee Gas Specialty Company, Milwaukee, Wis., a corporation of Wisconsin Original application January 8, 1937, Serial No. 119,557. Divided and this application July 24, 1939, Serial No. 286,092

1 Claim. (Cl. 158—117.1)

This invention relates to thermoelectric safety devices for heating and other apparatus, and has particular relation to an improved thermocouple lead connecter.

The present application is a division of my co-pending application, Serial No. 119,557, filed January 8, 1937.

One of the main objects of the present invention is to provide an improved thermocouple lead connecter which is adapted to provide a quick detachable connection between the lead conductors of the thermocouple and the thermoelectric safety device.

The chief advantage of the improved quick detachable thermocouple lead connecter of the present invention is its ability to permit the thermocouple and lead conductors to be quickly and conveniently detached from and attached to the thermoelectric safety device. The quick detachable connection thus afforded permits the thermocouple and lead conductors to be detached and shipped disconnected or separately from the thermoelectric safety device, and it permits replacement of the thermocouple and lead conductors without returning the entire thermoelectric safety device to the manufacturer. Moreover, thermocouples with lead conductors of different lengths may be readily interchanged, and where, for instance, a thermoelectric safety device is shipped to a user with a thermocouple having lead conductors which are not of the proper length, the thermocouple and its lead conductors may be returned in exchange for a thermocouple having lead conductors of the proper length without returning the entire thermoelectric safety device.

It is also an object of the invention to provide a quick detachable thermocouple lead connecter of relatively simple and inexpensive construction, and which is composed of few parts adapted for convenient assembly; also, an improved thermocouple lead connecter adapted to be quickly and conveniently detached from and attached to the thermoelectric safety device and adapted, when attached, to provide a good thermoelectric connection between the thermocouple lead conductors and the connected device.

Further objects and advantages of the invention will appear from the following detailed description taken in connection with the accompanying drawing, in which.

Figure 1:
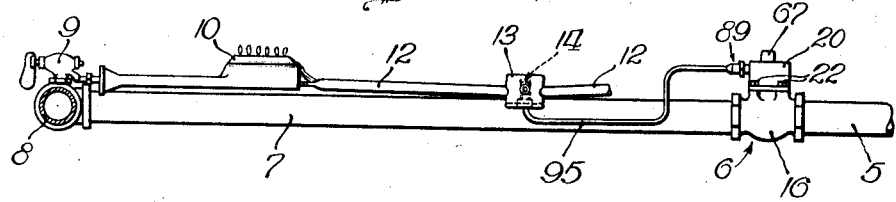
Figure 1 is a diagrammatic view showing, applied to heating apparatus, a thermoelectric safety device having a thermocouple lead connecter embodying the present invention.

Referring now in detail to the drawing, in Figure 1 I have shown the main fuel supply pipe 5 having the safety device 6 mounted therein and communicating from the outlet side of the safety device through the pipe 7 to a fuel supply manifold or the like, indicated at 8, provided with the usual gas cock 9 which may be either manually or automatically operated for delivering fuel under pressure to the main burner 10.

The burner 10 is preferably ignited by means of a lighter tube 12 which extends into the torch head 13 receiving the pilot tip indicated generally at 14. In Figure 1, the device has been shown as applied to a gas range in which a number of burners 10 may be mounted symmetrically about the torch head 13, each being provided with a lighter tube 12 whereby gas or other fuel from the main burner 10 is transmitted through an auxiliary port and the tube 12 to the pilot burner, is there ignited, and flashes back to the burner to ignite the same. It is to be understood, however, that the torch head 13 and lighter tubes 12 may be omitted, and in such case the pilot burner 14 may be disposed directly in juxtaposition to the main burner 10, as, for instance, where only a single burner is employed, such as in hot water heaters, space or room heaters, or in other types of heating apparatus.

The thermoelectric safety device 6 may be of any suitable or preferred form. The particular device shown in the drawing, which, so far as the present invention is concerned, is for purposes of illustration only, comprises the main valve body 15 provided with an inlet chamber 16 and an outlet chamber 17. Intermediate these chambers is a partition 18 forming the valve seat 19 which surrounds the opening through which communication is effected between the inlet and outlet chambers.

Figure 2:
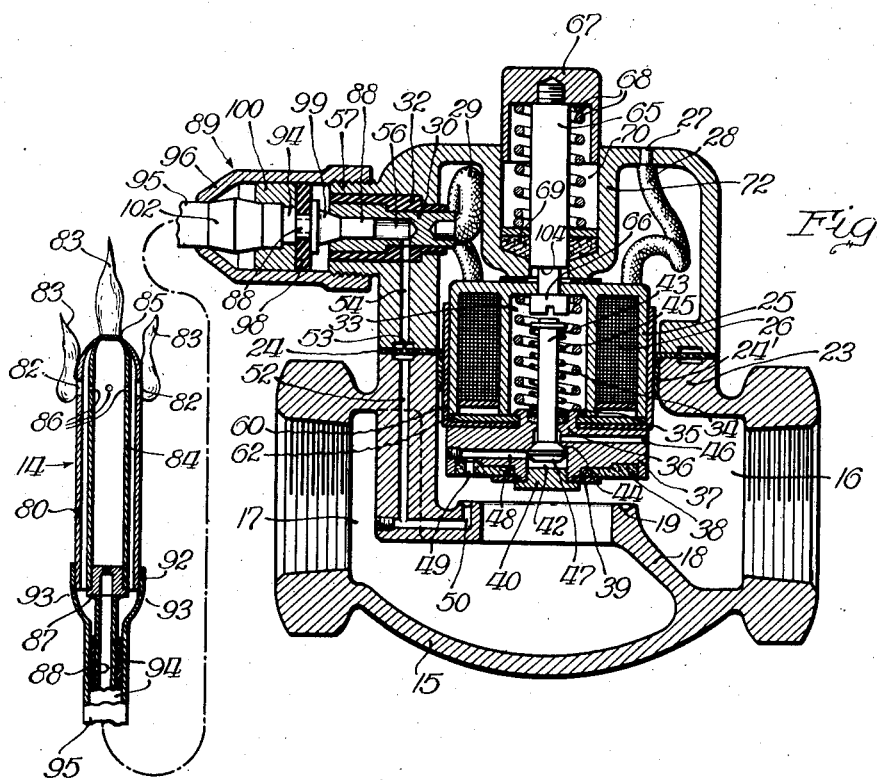
Figure 2 is a sectional view through the thermoelectric safety device illustrated in Figure 1 and showing in section the thermoelectric lead connecter for the safety device illustrated in Figure 1.

Mounted in any suitable manner upon the upper portion of the valve body 15 as the same is viewed in Figure 2 is a hood or housing 20 which may be bolted to the valve body as indicated by the cap screws 22, or may be secured thereto in any other suitable or desired manner. Interposed between the hood or housing 20, which is shown as of inverted generally cup-shaped form, and the annular shoulder 23 of the valve body 15 is gasket means 24 which seals the surfaces that are clamped together, and is provided with an axially extending flange portion 24' at its inner periphery.

Mounted in the passage formed between the valve body 15 and the hood 20 is a magnet frame 25 having the electromagnet coil 26 wound between the annular legs thereof. The coil 26 has one terminal grounded to the metallic hood or housing 20, as indicated at 27, through a flexible conductor 28, and its opposite terminal is connected through a flexible conductor 29 to a terminal stud 30 which is insulated from the hood 20 by an insulating bushing 32.

The magnet frame 25 is provided with a central axially extending recess 33 which is adapted to receive a coiled spring 34 biased at one end against the inner end of the recess 33 and, at its opposite end, bearing against the turned over edge 35 of the projecting stem 36 of valve member 37. The valve member 37 is provided with a leather or other suitable yielding valve seating member 38 adapted to have engagement with the valve seat 19. The yielding seating material 38 is held in position by a retaining washer or disc 39 which, in turn, is secured to the valve disc 37 by a threaded plug 40 extending into the open end of the recess 42 formed in the valve disc.

A suitable valve stem 43 has a valve stem head 47 disposed in the recess 42 of the member 37 and normally pressed into seating engagement with the valve seat 44 by means of a spring 45 which encircles the valve stem and is biased at its lower end against the packing carried in a recess at the upper end of the valve disc.

The valve disc member 37 is provided with a laterally extending port 46 which extends into and communicates with the passageway 42 outwardly of the valve stem head 47. The valve member 37 is also provided with a second axially offset laterally extending passageway 48 which, adjacent its outer end, communicates through the passageway 49 directed axially of the valve member and through the seating member 38 to the inner face of the valve member.

The valve seat 19 is provided with a passageway 50 adapted to be aligned with the passageway 49 and extending outwardly through the valve body, as indicated at 52, to the gasket 24. The gasket 24 is apertured at 53 to provide communication between the passageway 52 and a corresponding passageway 54 extending through one side wall of the housing or hood 20 and through the insulating bushing 32 into the interior of the terminal member 30, which terminal member is provided with an axially outwardly directed recess 56 which opens outwardly through the threaded boss portion 57 extending laterally from the side of the housing 20.

The valve member 37 forms, together with the cup-shaped member 60 and the annular plate member 62, an armature-like valve member which is movable toward and away from the lower end of the magnet frame 25, having sliding movement guided by the axially extending flange portion 24' of the gasket 24. Thus, when the coil 26 is deenergized, or at least not energized sufficiently to hold the armature to the electromagnet, the spring 34 urges the armature, consisting of the members 60, 62, and 37, inwardly to retracted position away from the inner end of the magnet frame 25 and into engagement with the valve seat 19.

The magnet frame 25 is normally retained in position within the safety device by means of a spindle member or reset stem 65 which has the head portion 66, for instance in the form of a screw, for securing the magnet frame to the stem 65. The stem 65 extends outwardly and carries at its outer end the reset button 67 which is threaded to the end of the stem and is recessed to receive one end of the spring 68. The opposite end of the spring 68 bears against packing 69 carried within the recessed portion 70 formed, for instance, in the wall 72 which is shown integral with the hood 20 and extends inwardly from the outer end thereof. The spring 68 normally urges the button 67 outwardly of the housing 20, and thereby urges the spindle 65 outwardly, holding the magnet frame 25 against the lower end of the wall 72 of the housing which defines the recess 70.

The particular pilot burner shown in the drawing and which is merely illustrative of a suitable pilot burner, comprises an outer tubular member 80 which is provided with relatively large open ports 82 through which pilot flames 83 are adapted to project as indicated diagrammatically in Figure 2, and which is joined to an inner tubular member 84, there being a welded or other suitable junction between these two members, as indicated at 85, forming a thermocouple junction which is disposed in the path of the pilot flame 83. The inner tubular member 84 is provided with a plurality of ports 86 of reduced area as compared with the ports 82, and is connected at its open end through the bushing 87 with a hollow metallic conduit or inner tubular lead conductor which extends to the pilot burner and thermocouple lead connection indicated generally at 89, whereby the burner and thermocouple are connected to the safety device 6.

The inner tubular thermocouple lead conductor 88 is enclosed within an outer tubular thermocouple lead conductor 95, the outer end of which is enlarged or provided with spider-like member at 92 which telescopes over the inner end of the outer thermocouple member 80 and is suitably joined thereto. The enlarged end or member 92 of the outer lead conductor is provided with openings 93 for admitting air into the space between the members 80 and 84, this air merging with the gas issuing from the ports 86 to produce the gaseous mixture which, when ignited, forms the pilot flames 83. Suitable insulation 94 is provided between the inner and outer lead conductors 88 and 95.

It will thus be seen that a thermocouple junction is provided at 85, this junction being subject to the heat of the pilot flame, and that one terminal of the junction 85 is connected through the outer thermocouple member 80 and the tubular lead conductor 95 to the thimble or couple lead attaching nut 96 which is threaded over the threaded extension 57 of the housing or hood 20 and thereby completes a circuit connection to the grounded terminal 27 from one side of the coil 26. The other side of the thermocouple circuit extends from the inner tubular thermocouple member 84 and the inner tubular lead conductor 88 within the insulating sleeve 94 to the recess 56 formed in the terminal bushing 30. This makes metallic contact through the bushing 30 with the conductor 29 leading from the other side of the electromagnet coil 26.

In the illustrated embodiment of the invention, an insulating disc 98 is disposed about the projecting end of the inner tubular lead conductor 88 within the thimble or attaching nut 96, and a wedge-shaped member or connecter cone 99, preferably of ductile metal is disposed over the projecting end of the lead 88 whereby, upon threading of the nut 96 upon the extension 57, the wedge member or cone 99 is wedged together with the projecting end of the lead 88 into the recess 56 of the thimble 30, and consequently forms a positive and gas-tight electrical connection therewith which is insulated from the metal lead 95 and from the supporting sleeve 100 disposed within the nut 96. If desired, the metal lead 95 may be provided with a riding wipe or compression sleeve 102 with which the nut 96 engages at its reduced end in order to move the entire structure as a unit inwardly with respect to the bushing 30 when the nut 96 is tightened over the extension on the housing.

This provides a quick detachable connection not requiring the unloosening of any terminal screws, terminal lugs or the like, since, by merely unthreading the nut or thimble 96, the thermocouple and its lead conductors may be readily disconnected from the thermoelectric safety device. The outer end of the recess 56 is preferably of conical form to conform with the conical shape of the connecter cone 99 which is clamped tightly thereto by the nut 96 to provide good electric contact. The quick detachable thermocouple lead connection thus provided permits the thermocouple and lead connecters to be detached and shipped disconnected or separately from the thermoelectric safety device, and it permits replacement of the thermocouple and lead conductors without returning the entire thermoelectric safety device to the manufacturer as well as the other advantages hereinbefore set forth.

While the thermocouple lead shown in the drawing is adapted to supply fuel from the thermoelectric safety device to the pilot burner which is formed as a part of the thermocouple, this may vary widely within the broader aspects of the present invention. For example, the pilot burner may be formed separately of the thermocouple, with the thermocouple supported in the desired relation with respect thereto, and the pilot supply of fuel may be supplied to the pilot burner through a separate pilot supply tube. In the latter case, the inner thermocouple lead conductor 88 may be of solid instead of tubular form. For example, the thermocouple and lead connection therefor may be of the general character disclosed and claimed in Oscar J. Leins Patent No. 2,126,564, granted August 9, 1938, or of any other suitable or preferred form.

In the operation of the device as thus far described, the device is shown in Figure 2 as being in valve open position with the pilot flame ignited and the electromagnet coil 26 thereby energized to hold the armature, including the valve member 37, to the magnet frame against the resistance of the spring 34. This is due to the fact that the heat of the pilot flame acting on the thermal junction 85 creates a thermoelectric current flow through the thermocouple lead conductors and thereby a thermoelectric current flow through the coil 26 sufficient to magnetize the magnet frame 25 and create an attractive force on the valve member 37 which will hold the valve member against the magnet frame.

Consider now that the pilot flame is accidentally extinguished. The thermocouple junction cools rapidly and thereby deenergizes the coil 26, or at least the electromagnet ceases to be energized sufficiently to hold the armature including the valve member 37 in attracted position. The spring 34 thereupon snaps the valve member 37 inwardly into engagement with the valve seat 19. This results in relative sliding movement of the cup-shaped member 60 with respect to the gasket portion 24' while the magnet frame and coil 26 remain in fixed position due to the effect of the spring 68. The valve is therefore closed, closing off communication between the inlet chamber 16 and the outlet chamber 17, and also closing off the fuel supply to the pilot burner. This latter fuel supply is closed off due to the fact that the spring 45 retains the valve stem 43 in position with the head 47 thereof pressed against the valve seat 44 so that no fuel may flow from the inlet chamber 16 through the passageways 46 and 48 to the passageway 50.

When it is desired either to ignite the main burner or to reignite the pilot burner, the resetting button 67 is pushed manually inwardly. This results in moving the spindle 65 inwardly and, as a result, the magnet frame 25 is moved inwardly, sliding inwardly within the upper end of the cup-shaped member 60 due to the fact that the shoulder 104 of the stem 65 engages the top of the magnet frame and forces it inwardly against the pressure of the spring 34. The head end 66 of the stem 65 engages the outer end of the valve stem 43, forcing the valve stem 43 away from its seat 44 and thereby opening communication between the passageways 46 and 48 formed in the valve member 37.

As a result, the gas or other fuel which is under pressure in the inlet chamber 16 flows through the passageways 46 and 48 and thence through the auxiliary extending passageway 49 into the passageway 50 formed in the valve seat 19. From the passageway 50 the fuel flows outwardly through the passageways 52 and 54 and into the recess 56 in the terminal bushing 30. From this recess the fuel passes through the hollow inner lead conductor 88 to the interior of the tubular thermocouple member 84, from which it escapes through ports 86 and mixes with air introduced into the interior of the tubular thermocouple member 80 and can be ignited as it issues with the air from the ports 82. The resulting pilot flames heat the thermocouple, thereby creating a thermoelectric current which, in turn, energizes the coil 26 and causes the armature formed by the members 60, 62, and 37 of the valve construction to be held positively in attracted position against the inner end of the magnet frame 25 by magnetic attraction.

As a result, when the reset button 67 is released, the spring 68 moves the button 67 and stem 65 outwardly which, in turn, through the head end 66 of the spindle 65 moves the magnet frame 25 outwardly and, consequently, with the valve member held in attracted position to the magnet frame, this valve member is moved outwardly with the magnet frame. This opens the valve and the fuel may then flow from the inlet chamber 16 through the valve opening surrounded by the seat 19 into the outlet chamber 17, and thence to the main burner or burners. At the same time sufficient fuel is still supplied through the port 50 in the valve seat to maintain the pilot burner 14 ignited, consequently retaining the valve member in attracted position against the inner end of the magnet frame 25. Upon any accidental extinguishment of the pilot burner, the electromagnet is immediately deenergized and the spring 34 consequently forces the valve member inwardly into engagement with the valve seat, thereby shutting off the flow of fuel to the main burner and, in the illustrated embodiment of the invention, also shutting off the flow of fuel to the pilot burner.

Figure 3:
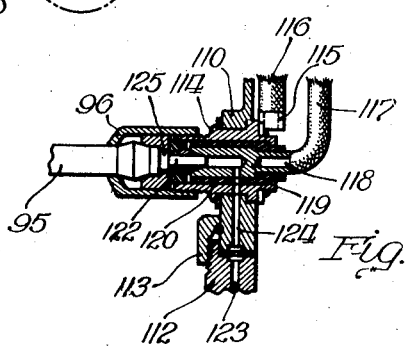
Figure 3 shows another form of thermocouple lead connecter embodying the present invention.

In Figure 3 I have shown a modified structure in which the coil 26 of the electromagnet is connected to the two thermocouple lead conductors and is not grounded to the housing of the safety device. In this embodiment of the invention the outer housing or hood of the safety device is indicated at 110 and is connected to the valve body housing 112 through the threaded sleeves 113. A suitable bushing 114 is secured in the side wall of the housing 110 and is adapted to receive on its inner end the terminal 115 of a conductor 116 leading to one side of the electromagnet coil 26. The other side of the coil 26 is connected through conductor 117 and terminal 118 to a terminal bushing 119 which is insulated within the bushing 114 by the insulating sleeve 120. The thermocouple connection leading from the pilot burner consists of the outer lead conductor 95, the thimble or attaching nut 96 which threads over the bushing 114 to effect electrical connection from the lead 95 through the nut 96, and bushing 114 with conductor 116, and the inner lead conductor 122 which extends into the terminal bushing 119 and is wedged therein in substantially the same manner as described in connection with Figure 2. At the same time gas for the pilot burner is supplied through ports 123 and 124 in the housings 112 and 110, respectively, to the interior of the terminal bushing 119 and thence through the hollow lead conductor 122 to the pilot burner. Suitable insulating means 125 is provided between the outer metallic lead 95 and the inner metallic lead 122. The details of the manner in which the thermocouple and burner connections can be quickly connected to and disconnected from the thermoelectric safety device is believed apparent from the drawing when considered in conjunction with the description of this particular manner of assembly as set forth in connection with Figure 2.

The features of the thermocouple and pilot burner and the manner in which the fuel is supplied through the thermoelectric safety valve to the pilot burner are covered in my copending application hereinbefore identified, and the magnetic valve is covered in my copending application Serial No. 182,669, filed December 31, 1937. The present application is directed to the improved thermocouple lead connecter.

I do not intend to be limited to the precise details shown or described.

I claim:

In combination, a thermoelectric safety device having an electromagnet and a housing provided with a fuel supply passageway, a terminal stud extending from said housing and connected in circuit with one side of said electromagnet, a tubular terminal member connected in circuit with the other side of said electromagnet and disposed within and insulated from said terminal stud, a combined pilot burner and thermocouple comprising a pair of thermocouple members joined to form a thermal junction adapted to be heated by the pilot burner, an outer tubular lead conductor joined to one of said thermocouple members, an inner tubular lead conductor extending through said outer tubular lead conductor, said inner lead conductor being insulated from said outer tubular lead conductor and joined to the other thermocouple member and adapted for supplying fuel to the pilot burner, and a metallic attaching nut on said outer tubular lead conductor and adapted for quick detachable engagement with said terminal stud to secure the inner end of said inner lead conductor in good quick detachable contact with the terminal member disposed within said terminal stud, also in fuel tight connection with the fuel supply passageway in said housing and serving to connect the outer lead conductor in circuit with the electromagnet.

HAROLD A. MANTZ.